United States Patent
Kim et al.

(10) Patent No.: US 10,023,040 B2
(45) Date of Patent: Jul. 17, 2018

(54) POWER TRANSMISSION SYSTEM FOR HYBRID ELECTRIC VEHICLE

(71) Applicant: Hyundai Motor Company, Seoul (KR)

(72) Inventors: Baekyu Kim, Suwon-si (KR); Seok Joon Kim, Yongin-si (KR); Junyoung Ha, Ulsan (KR); Chulmin Ahn, Busan (KR); SungGon Byun, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/354,844

(22) Filed: Nov. 17, 2016

(65) Prior Publication Data

US 2018/0022199 A1 Jan. 25, 2018

(30) Foreign Application Priority Data

Jul. 21, 2016 (KR) .................... 10-2016-0092362

(51) Int. Cl.
| | |
|---|---|
| *B60K 6/365* | (2007.10) |
| *F16H 3/72* | (2006.01) |
| *B60K 6/44* | (2007.10) |
| *B60K 6/40* | (2007.10) |

(52) U.S. Cl.
CPC ............ *B60K 6/365* (2013.01); *B60K 6/40* (2013.01); *B60K 6/44* (2013.01); *F16H 3/724* (2013.01); *B60Y 2200/92* (2013.01); *B60Y 2400/73* (2013.01); *Y10S 903/91* (2013.01)

(58) Field of Classification Search
None
See application file for complete search history.

(56) References Cited

U.S. PATENT DOCUMENTS

| | | | |
|---|---|---|---|
| 3,876,332 A * | 4/1975 | Kashmerick | B63H 23/34 416/134 R |
| 5,795,037 A * | 8/1998 | Hagelthorn | B60B 27/001 301/105.1 |
| 6,695,736 B2 | 2/2004 | Takenaka | |

(Continued)

FOREIGN PATENT DOCUMENTS

| | | |
|---|---|---|
| JP | 05-209662 A | 8/1993 |
| JP | 2013-221566 A | 10/2013 |

(Continued)

*Primary Examiner* — Justin Holmes
(74) *Attorney, Agent, or Firm* — Morgan, Lewis & Bockius LLP

(57) ABSTRACT

A power transmission system for a hybrid electric vehicle may include an engine, a planetary gear set, and first and second motor/generators, and transmit rotational power of the engine and rotational power of the second motor/generator to a final reduction gear including a differential through independent paths, respectively, in which a sun gear is directly connected with the first motor/generator through a first motor shaft and selectively connectable with a transmission housing, a planet carrier is directly connected with an input shaft and connected with the transmission housing with a one-way clutch and a torque limiter positioned therebetween, a ring gear is directly connected with a first output gear and connected with a final reduction gear through a first intermediate shaft, and the second motor/generator is directly connected with a second output gear through a second motor shaft and connected with the final reduction gear through a second intermediate shaft.

7 Claims, 3 Drawing Sheets

(56) References Cited

U.S. PATENT DOCUMENTS

| | | | |
|---|---|---|---|
| 6,910,981 B2 | 6/2005 | Minagawa et al. | |
| 7,189,177 B2 * | 3/2007 | Takasu | B60K 6/365 |
| | | | 180/65.28 |
| 2009/0005923 A1 * | 1/2009 | Shimizu | B60K 6/445 |
| | | | 701/22 |
| 2010/0242685 A1 * | 9/2010 | Chang | B25B 13/463 |
| | | | 81/63.2 |
| 2012/0244988 A1 * | 9/2012 | Aota | F16H 3/66 |
| | | | 475/281 |
| 2013/0225351 A1 * | 8/2013 | Reimann | F16H 47/04 |
| | | | 475/35 |
| 2014/0371017 A1 * | 12/2014 | Ono | B60K 6/365 |
| | | | 475/5 |
| 2015/0267777 A1 * | 9/2015 | Shin | F16H 37/0813 |
| | | | 475/332 |

FOREIGN PATENT DOCUMENTS

| | | | |
|---|---|---|---|
| KR | 10-2008-0026837 A | | 3/2008 |
| KR | 10-0872440 B1 | | 12/2008 |
| KR | 101416422 B1 * | | 7/2014 |
| KR | 10-2016-0070423 A | | 6/2016 |
| SU | 1445989 A1 * | | 12/1988 |

* cited by examiner

POWER TRANSMISSION SYSTEM FOR HYBRID ELECTRIC VEHICLE

CROSS-REFERENCE TO RELATED APPLICATION

The present application claims priority to and the benefit of Korean Patent Application No. 10-2016-0092362 filed on Jul. 21, 2016, the entire contents of which are incorporated herein by reference.

BACKGROUND OF THE INVENTION

Field of the Invention

The present invention relates to a power transmission system for a hybrid electric vehicle, and more particularly, to a power transmission system for a hybrid electric vehicle, which is configured for preventing damage to a one-way clutch caused by torque vibration properties of an engine, and reducing drag and a size of a planetary gear set by supporting inner sides of a planet carrier and a ring gear.

Description of Related Art

An environmentally-friendly technology of vehicles is a key technology that dictates the survival of the future vehicle industry, and advanced vehicle manufactures have a great effort to develop environmentally-friendly vehicles in order to meet regulations associated with environments and fuel economy.

Therefore, the vehicle manufactures have developed future vehicle technologies such as electric vehicles (EV), hybrid electric vehicles (HEV), and fuel cell electric vehicles (FCEV).

Because the future vehicle has various technical limitations in respect to weights and costs, the vehicle manufacturers have focused on the hybrid electric vehicle as an alternative for meeting emission regulations, and improving fuel economy performance, thereby solving practical problems, but face fierce competition in order to commercialize the hybrid electric vehicle.

The hybrid electric vehicle refers to a vehicle that uses two or more power sources, and a gasoline engine or a diesel engine which uses the existing fossil fuel and a motor/generator which is operated by electrical energy are used as the power sources.

At a low speed, the hybrid electric vehicle uses the motor/generator, as a main power source, which has relatively good low-speed torque characteristics, and at a high speed, the hybrid electric vehicle uses the engine, as a main power source, which has relatively good high-speed torque characteristics.

Therefore, in a low-speed section, the engine, which uses fossil fuel, stops operating, and the motor/generator is used, as a result, the hybrid electric vehicle has excellent effects of improving fuel economy and reducing emission of exhaust gas.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system for a hybrid electric vehicle, which is configured for preventing damage to a one-way clutch caused by torque vibration properties of the engine, and reducing drag and a size of a planetary gear set by supporting inner sides of a planet carrier and a ring gear.

Various aspects of the present invention are directed to providing a power transmission system for a hybrid electric vehicle, which includes an engine which is a main power source, a planetary gear set, and first and second motor/generators which are auxiliary power sources, and transmits rotational power of the engine and rotational power of the second motor/generator to a final reduction gear including a differential through independent paths, respectively, in which a sun gear of the planetary gear set is directly connected with the first motor/generator through a first motor shaft and selectively connectable with a transmission housing, a planet carrier is directly connected with an input shaft of the engine and connected with the transmission housing with a one-way clutch and a torque limiter positioned therebetween, a ring gear is directly connected with a first output gear and connected with a final reduction gear through a first intermediate shaft, and the second motor/generator is directly connected with a second output gear through a second motor shaft and connected with the final reduction gear through a second intermediate shaft.

The planetary gear set may be a single-pinion planetary gear set.

The torque limiter may be positioned between the transmission housing and the one-way clutch connected to the planet carrier.

A planet carrier support bearing may be positioned between a radially inner side of the planet carrier and the transmission housing.

An input shaft bearing for supporting the input shaft and a ring gear support bearing for supporting the ring gear may be positioned on a same axis and a same plane.

The first motor shaft and a first rotor shaft of the first motor/generator may be connected by fastening a locknut in a state in which the first motor shaft and the first rotor shaft are spline-coupled to each other.

A splined portion and a threaded portion may be formed on an outer circumferential surface of a tip portion of the first motor shaft, the first rotor shaft may be formed to have a hollow portion and have a splined portion formed at an inner diameter of the tip portion of the first rotor shaft, and the first motor shaft and the first rotor shaft may be connected to each other by fastening the locknut to the threaded portion through the hollow portion of the first rotor shaft in a state in which the first rotor shaft and the first motor shaft are spline-coupled by the splined portions.

A snap ring may be mounted, outside the locknut, in a ring groove formed in an inner circumferential surface of the first rotor shaft to prevent release of the locknut.

In the exemplary embodiment of the present invention, the torque limiter is positioned between the transmission housing and the one-way clutch connected to the planet carrier of the planetary gear set, preventing the one-way clutch from being damaged due to transmission of over torque caused by torque vibration properties of the engine.

In addition, the planet carrier support bearing is positioned between the radially inner side of the planet carrier and the transmission housing to support the planet carrier, and the input shaft bearing and the ring gear support bearing are positioned on a same axis and a same plane, such that the inside of the ring gear is supported, as a result, it is possible to reduce drag and an overall size of the planetary gear set.

In addition, when connecting the first motor shaft, which is connected integrally with the sun gear of the planetary gear set, to the first motor/generator, the first rotor shaft of the first motor/generator is spline-coupled to the outer circumference of the end portion of the first motor shaft, and the locknut is then fastened and connected, and as a result, it is possible to support axial force of the sun gear, and to omit the sun gear support bearing by using properties of the planetary gear set having a larger radial clearance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
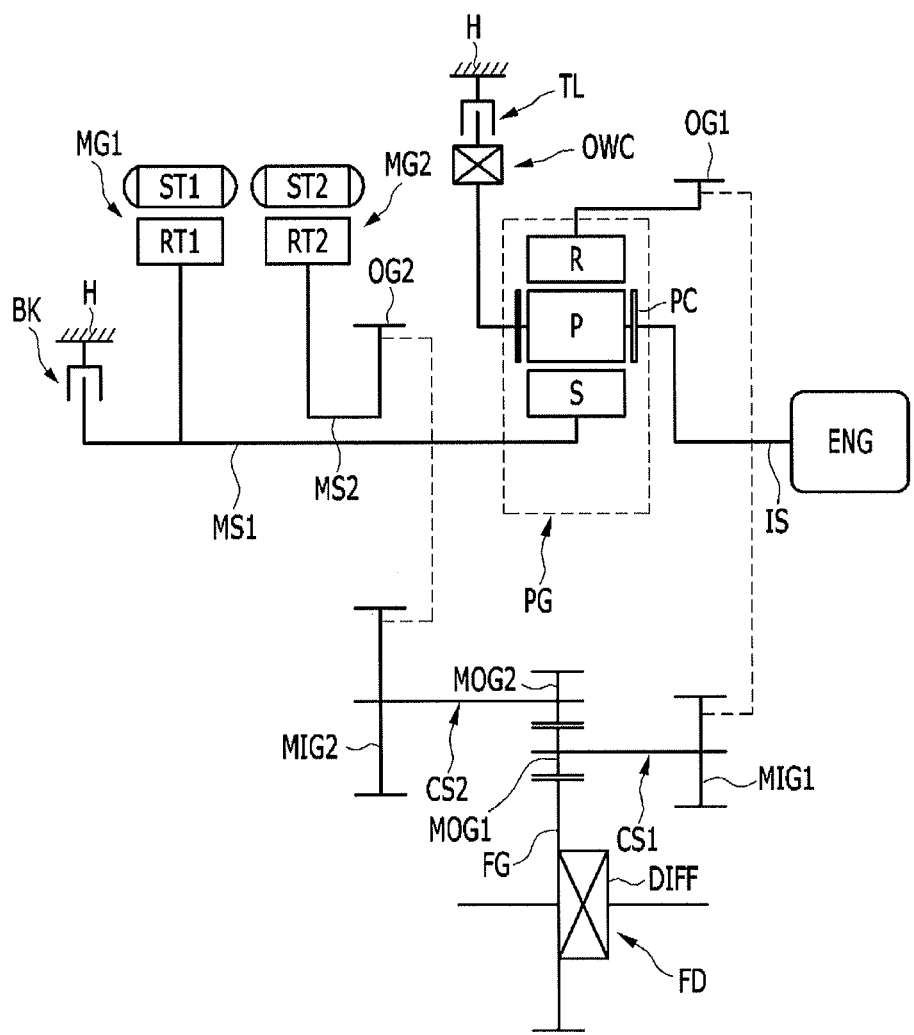
FIG. 1 is a configuration diagram of a power transmission system for a hybrid electric vehicle to which the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar constituent elements will be designated by the same reference numerals throughout the specification.

In the following description, dividing names of components into first, second and the like is to divide the names because the names of the components are the same as each other and an order thereof is not particularly limited.

FIG. 1 is a schematic diagram of a power transmission system for a hybrid electric vehicle to which the present invention is applied.

Referring to FIG. 1, a power transmission system for a hybrid electric vehicle according to an exemplary embodiment of the present invention uses an engine ENG and first and second motor/generators MG1 and MG2 as power sources, and includes a planetary gear set PG as a power distribution means.

The engine ENG serves as a main power source, various types of publicly known engines including gasoline engines or diesel engines that use the existing fossil fuel may be used as the engine, and rotational power outputted from the engine ENG is inputted to an input shaft IS.

The planetary gear set PG is a single-pinion planetary gear set, and includes, as rotation elements, a sun gear S, a planet carrier PC which rotatably supports a pinion P that externally meshes with the sun gear S, and a ring gear R which internally meshes with the pinion P.

The sun gear S of the planetary gear set PG is directly connected with the first motor/generator MG1 through a first motor shaft MS1, the planet carrier PC is directly connected with the input shaft IS, and the ring gear R is directly connected with a first output gear OG1 and operates as an output element.

Further, the planet carrier PC is connected to a transmission housing H with a one-way clutch OWC and a torque limiter TL positioned therebetween, and operates as a selective fixed element. The sun gear S is connected to the transmission housing H with a brake BK positioned therebetween, and operates as a selective fixed element.

The torque limiter TL is a device for limiting transmission of torque, and slips when the engine starts and when a rotational speed of the planet carrier PC is equal to or higher than a predetermined RPM, preventing transmission of over torque caused by torque vibration properties of the engine ENG.

The first motor/generator MG1 functions as a motor or generator, and includes a first stator ST1 fixed to the transmission housing, and a first rotor RT1 rotatably positioned radially inside the first stator ST1.

The second motor/generator MG2 functions as a motor or generator, and includes a second stator ST2 fixed to the transmission housing, and a second rotor RT2 rotatably positioned radially inside the second stator ST2.

Further, the first rotor RT1 is directly connected with the first motor shaft MS1, and the second rotor RT2 is directly connected with the second motor shaft MS2. The second motor shaft MS2 is a hollow shaft, and may be positioned around an outer circumference of the first motor shaft MS1 without rotational interference. A second output gear OG2 is directly connected to the second motor shaft MS2.

In addition, rotational power outputted from the first and second output gears OG1 and OG2 is transmitted to a final reduction mechanism FD, which includes a differential DIFF, through first and second intermediate shafts CS1 and CS2 which are positioned in parallel with the first and second motor shafts MS1 and MS2 at a predetermined interval.

The first intermediate shaft CS1 includes a first intermediate input gear MIG1 which is externally gear-engaged with the first output gear OG1, and a first intermediate output gear MOG1 which is externally gear-engaged with a final reduction gear FG of the final reduction mechanism FD.

The second intermediate shaft CS2 includes a second intermediate input gear MIG2 which is externally gear-engaged with the second output gear OG2, and a second intermediate output gear MOG2 which is externally gear-engaged with the first intermediate output gear MOG1.

Therefore, the first intermediate shaft CS1 transmits rotational power of the engine EGN, which is transmitted from the planetary gear set PG, to the final reduction gear FG of the final reduction mechanism FD including the differential DIFF, and the second intermediate shaft CS2 transmits rotational power, which is transmitted from the second motor/generator MG2, to the final reduction gear FG of the final reduction mechanism FD including the differential DIFF.

The power transmission system for a hybrid electric vehicle according to the exemplary embodiment of the present invention, which is configured as described above, may drive the vehicle like a power transmission system of a typical hybrid electric vehicle.

Figure 2:
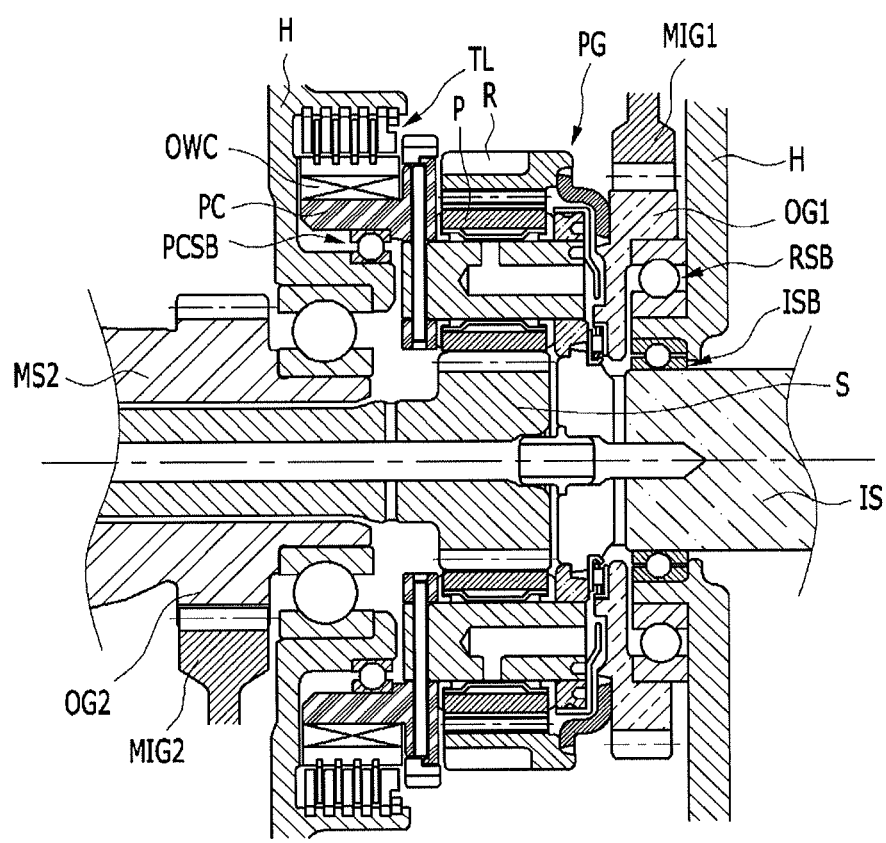
FIG. 2 is a view illustrating a state in which a planetary gear set according to an exemplary embodiment of the present invention is positioned.

FIG. 2 is a view illustrating a state in which the planetary gear set according to an exemplary embodiment of the present invention is positioned.

Referring to FIG. 2, in the arrangement of the planetary gear set PG, the torque limiter TL is positioned between the transmission housing H and the one-way clutch OWC connected to the planet carrier PC, preventing damage to the one-way clutch OWC caused by transmission of over torque due to torque vibration properties of the engine.

In addition, a planet carrier support bearing PCSB is positioned between a radially inner side of the planet carrier PC and the transmission housing H, rotatably supporting the planet carrier PC. An input shaft bearing ISB and a ring gear support bearing RSB are positioned on a same axis and a same plane, and as a result, an action of supporting the rotation by using an inside of the ring gear R is performed, reducing drag and an overall size of the planetary gear set PG.

Figure 3:
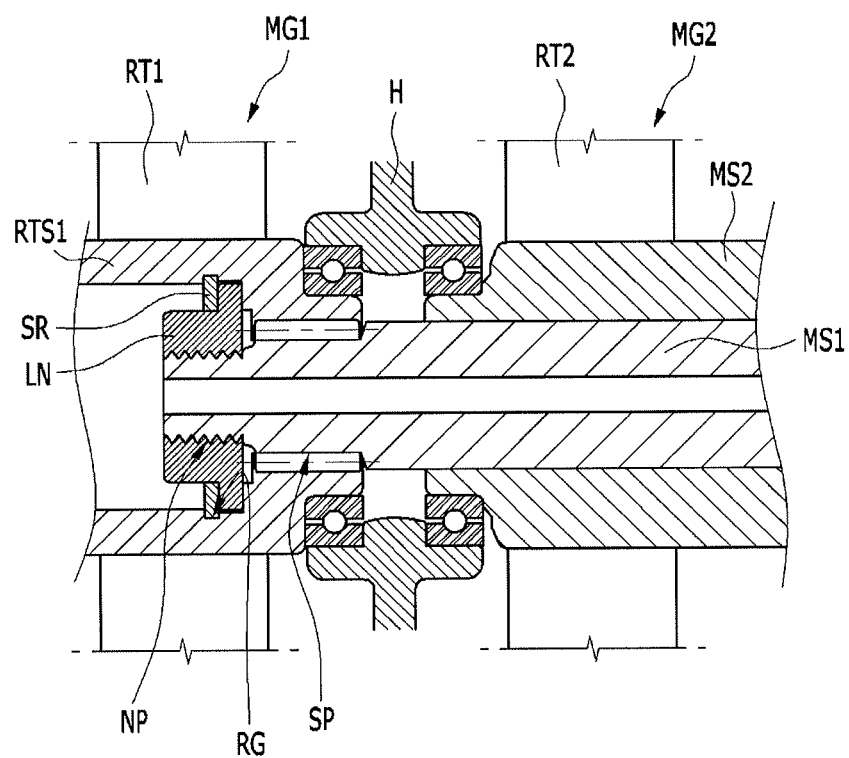
FIG. 3 is a view illustrating a state in which a first motor/generator and a first motor shaft according to the exemplary embodiment of the present invention are connected.

FIG. 3 is a view illustrating a state in which a first motor/generator and a first motor shaft according to the exemplary embodiment of the present invention are connected.

Referring to FIG. 3, when connecting the first motor shaft MS1, which is formed integrally with the sun gear S of the planetary gear set PG, to the first motor/generator MG1, a first rotor shaft RTS1 is spline-coupled to an outer circumference of an end portion of the first motor shaft MS1, a locknut LN is then fastened and connected, and a snap ring SR is fastened to prevent release of the locknut LN.

That is, a splined portion SP and a threaded portion LP are formed on inner and outer circumferential surfaces of a tip portion of the first motor shaft MS1, respectively, and the first rotor shaft RTS1 is formed to have a hollow portion and has a splined portion SP formed at an inner diameter of a tip portion of the first rotor shaft RTS1.

Therefore, the first rotor shaft RTS1 and the first motor shaft MS1 are fastened to each other by thread-fastening the locknut LN to the threaded portion NP through the hollow portion of the first rotor shaft RTS1 in a state in which the first rotor shaft RTS1 and the first motor shaft MS1 are spline-coupled to each other by the splined portions SP.

In addition, the snap ring SR is fitted into a ring groove RG formed in an inner circumferential surface in the hollow portion of the first rotor shaft RTS1, and axially supports an outside of the locknut NL.

Therefore, it is possible to support axial force of the sun gear S, and to omit a sun gear support bearing by using properties of the planetary gear set PG having a larger radial clearance.

In the exemplary embodiment of the present invention, the torque limiter TL is positioned between the transmission housing H and the one-way clutch OWC connected to the planet carrier PC of the planetary gear set PG, such that it is possible to prevent the one-way clutch OWC from being damaged due to transmission of over torque caused by torque vibration properties of the engine.

In addition, the planet carrier support bearing PCSB is positioned between the radially inner side of the planet carrier PC and the transmission housing H to support the planet carrier PC, and the input shaft bearing ISB and the ring gear support bearing RSB are positioned on a same axis and a same plane such that the inside of the ring gear R is supported, and as a result, it is possible to reduce drag and an overall size of the planetary gear set PG.

In addition, when connecting the first motor shaft MS1, which is connected integrally with the sun gear S of the planetary gear set PG, to the first motor/generator MG1, the first rotor shaft RTS1 of the first motor/generator MG1 is spline-coupled to the outer circumference of the end portion of the first motor shaft MS1, and the locknut is then fastened and connected, and as a result, it is possible to support axial force of the sun gear S, and to omit the sun gear support bearing by using properties of the planetary gear set PG having a larger radial clearance.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system for a hybrid electric vehicle, which includes an engine which is a main power source, a planetary gear set, and first and second motor/generators which are auxiliary power sources, and transmits rotational power of the engine and rotational power of the second motor/generator to a final reduction gear including a differential through independent paths, respectively, wherein a sun gear of the planetary gear set is directly connected with the first motor/generator through a first motor shaft and selectively connectable with a transmission housing, a planet carrier is directly connected with an input shaft of the engine and connected with the transmission housing with a one-way clutch and a torque limiter positioned therebetween, a ring gear is directly connected with a first output gear and connected with a final reduction gear through a first intermediate shaft, and the second motor/generator is directly connected with a second output gear through a second motor shaft and connected with the final reduction gear through a second intermediate shaft, wherein the torque limiter is positioned between the transmission housing and the one-way clutch connected to the planet carrier, connecting the transfusion housing, the torque limiter, the one-way clutch and the planet carrier in series, such that, when a rotational speed of the planet carrier is equal to or higher than a predetermined revolutions per minute, the torque limiter slips so as to prevent transmission of over torque to the one-way clutch, thereby preventing damage to the one-way clutch.

2. The power transmission system of claim 1, wherein the planetary gear set is a single-pinion planetary gear set.

3. The power transmission system of claim 1, wherein a planet carrier support bearing is positioned between a radially inner side of the planet carrier and the transmission housing.

4. The power transmission system of claim 1, wherein an input shaft bearing for supporting the input shaft and a ring gear support bearing for supporting the ring gear are positioned on a same axis and a same plane.

5. The power transmission system of claim 1, wherein the first motor shaft and a first rotor shaft of the first motor/generator are connected by fastening a locknut in a state in which the first motor shaft and the first rotor shaft are spline-coupled to each other.

6. The power transmission system of claim 5, wherein a splined portion and a threaded portion are formed on an outer circumferential surface of a tip portion of the first motor shaft, the first rotor shaft is formed to have a hollow portion and has a splined portion formed at an inner diameter of the tip portion of the first rotor shaft, and the first motor shaft and the first rotor shaft are connected to each other by fastening the locknut to the threaded portion through the hollow portion of the first rotor shaft in a state in which the first rotor shaft and the first motor shaft are spline-coupled by the splined portions.

7. The power transmission system of claim 6, wherein a snap ring is installed, outside the locknut, in a ring groove formed in an inner circumferential surface of the first rotor shaft to prevent release of the locknut.

* * * * *